United States Patent [19]
Forster

[11] Patent Number: 5,318,484
[45] Date of Patent: Jun. 7, 1994

[54] METAL V-BELT DRIVE

[76] Inventor: Lloyd M. Forster, 1827 Golf Ridge Dr., Bloomfield Hills, Mich. 48302

[21] Appl. No.: 42,464

[22] Filed: Apr. 6, 1993

Related U.S. Application Data

[63] Continuation-in-part of Ser. No. 891,741, Jun. 1, 1992, abandoned.

[51] Int. Cl.$^5$ .............................................. F16G 1/22
[52] U.S. Cl. ................................................... 474/242
[58] Field of Search ...................... 474/237, 240–242, 474/272

[56] References Cited

U.S. PATENT DOCUMENTS

| | | | |
|---|---|---|---|
| 4,642,076 | 2/1987 | Howerton | 474/242 X |
| 4,894,048 | 1/1990 | Inukai et al. | 474/242 X |
| 5,007,884 | 4/1991 | Masuda et al. | 474/242 |

Primary Examiner—Thuy M. Bui
Attorney, Agent, or Firm—Lloyd M. Forster

[57] ABSTRACT

Metal V-belt drive having small angle V-pulleys engaged by belt mounted pairs of bridging traction drive toggle elements radially loaded by belt tension to provide locking angle driving contact subject to free radial releasing upon leaving each pulley.

25 Claims, 4 Drawing Sheets

LOAD BLOCK

DRIVING

BELT

PULLEY

RELEASING

THIS FACE CONTACTS PULLEY (NOTE: BLOCKS ARE GUIDED BY BANDS BUT ARE NOT ATTACHED TO BANDS.)

BANDS (LAMINATED-10 INDIVIDUAL LAYERS)

CROWNED SURFACE FOR BANDS (PRIOR ART)

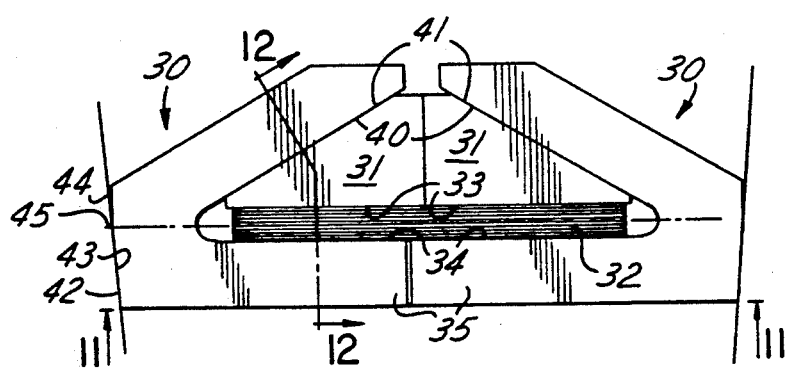
FIG.10
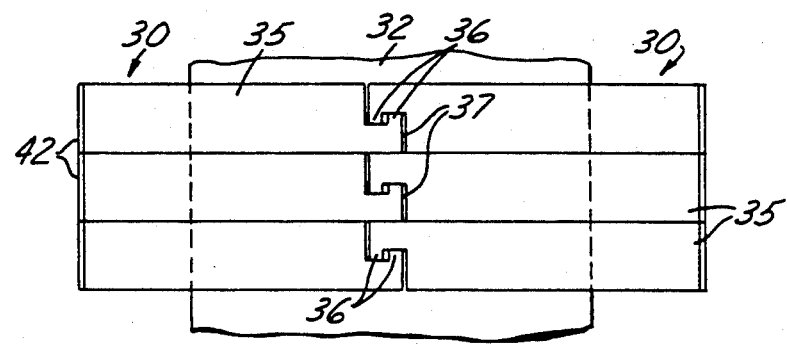
FIG.11
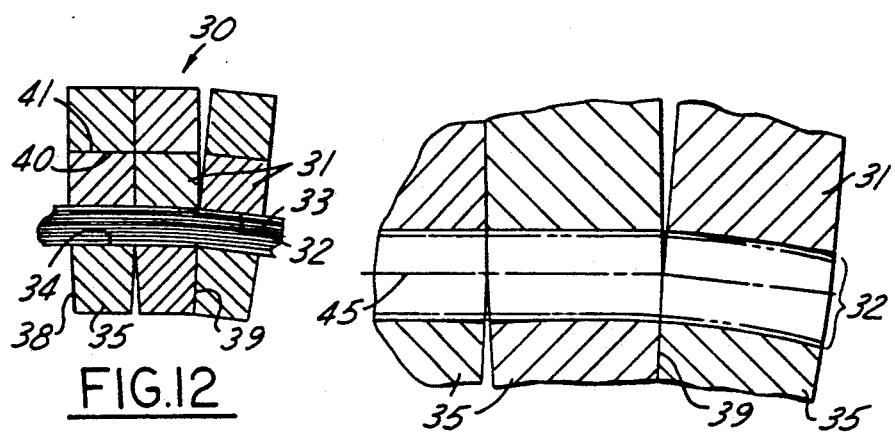
FIG.12  FIG.13
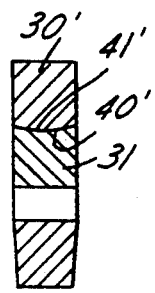
FIG.14
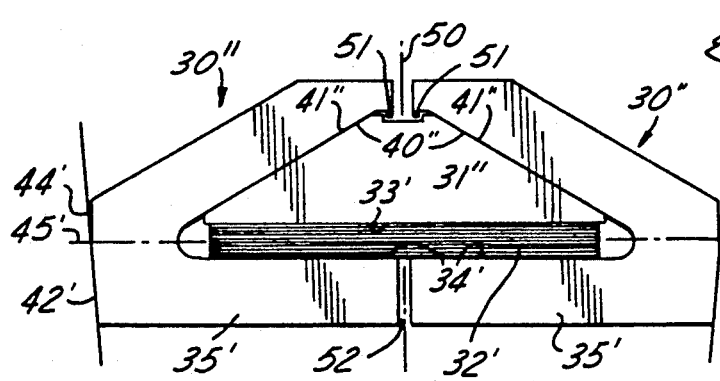
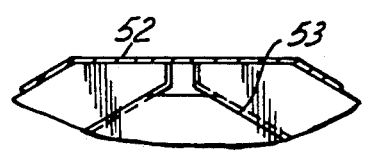
FIG.16
FIG.15

METAL V-BELT DRIVE

This application is a continuation-in-part of copending application, Ser. No. 07/891,741 filed on Jun. 1, 1992, previously and now abandoned.

BACKGROUND OF THE INVENTION

High capacity all metal V-belts for transmitting drive between continuously variable pulleys are known in the art. Belts constructed of endless metal bands or chain links have rigid bridging transverse load blocks which engage pulley faces to transmit traction drive under contact pressure imposed radially by belt tension. Typical rigid load blocks employed with multiple laminated individual band layers in a "compression" drive are disclosed in Van Doorne et al, U.S. Pat. No. 3,720,113. Similar alternative rigid load blocks are disclosed in the CVT belt of U.S. Pat. No. 4,911,682, and in chain belt U.S. Pat No. 4,993,999 and 5,026,332.

Such load blocks engage eleven degree (11°) pulley faces (22° included angle) with oil environment and typical friction coefficients which provide free release on leaving each pulley. The transverse rigid load blocks carried by the belt engage the pulley faces with a contact pressure imposed by belt tension amplified by a factor of 5.24 times the radial load (1/sine 11°). This provides the equivalent of a corresponding increase in traction coefficient in determining required back tension to prevent drive slippage under load. Notwithstanding such amplified contact pressure, substantial back tension is required which subtracts from the useful drive torque and power capacity.

BRIEF DESCRIPTION OF THE PRESENT INVENTION

Instead of solid transverse load blocks having spanning contact with the pulley faces, the present invention employs pairs of transverse drive transmitting "toggle" elements having central abutting contact with each other radially outward of end engagement with the pulley faces. Required clearance for radially outward toggle element deflection provides free release of driving engagement upon release of radial load in leaving each pulley, even with extremely small pulley face angles, while radially inward pressure of the belt on the bridging pair of elements during engagement provides a toggle effect in generating additional driving contact pressure against the pulley faces. The self-releasing toggle principle has been successfully tested with 5° pulley faces (10° included angle) with no resistance to free release. Since pulley face pressure imposed by belt tension radial load is amplified as a function of the sine of the face angle, a greatly increased contact pressure can be realized, apart from the toggle effect, by reducing the pulley angle, e.g., by a factor of 11.47 in the case of 5° pulley face angle as compared to 5.24 for 11°.

Thus, the pulley angle plus toggle effect serve a purpose equivalent to increasing the coefficient of friction by a factor corresponding to the amplification of contact pressure. The result in increased drive capacity without slipping through use of a decreased pulley angle, apart from toggle effect, is subject to definitive calculation by determining the minimum relative back tension required to prevent slippage under the formula:

$$T_1 = T_2 e^{fa}$$

In this formula, "$T_1$" is drive tension; "$T_2$" is minimum nonslip back tension; "e" is base of hyperbolic logarithm; "f" is coefficient of friction: and "a" is angle in radians subtending the arc of contact. The effective traction coefficient for applying such formula to pulley faces is equal to f/sine of side pulley angle.

An alterative application of the toggle drive element principle is disclosed which will provide belt clamping during pulley engagement, as well as free release at the exit, in a tension drive system. A pair of wedge elements provide central reaction contact radially outward of the belt and clamping engagement with the belt when actuated by toggle element contact with the pulley, which may also have 5° faces as discussed above. Each of the toggle elements is modified to provide an inwardly open V, matching the wedge angle, effective to press the respective wedge elements into clamping engagement with the belt.

A further modification employs a single bound faced wedge element oppositely engaged by the respective toggle element.

BRIEF DESCRIPTION OF THE DRAWINGS

FIG. 10 is a sectional view corresponding to FIG. 6, illustrating a modification to provide tension drive belt clamping action during pulley arc engagement;

FIG. 11 is a view of belt section taken along the line 11—11 of FIG. 10;

FIG. 12 is a sectional view taken along the line 12—12 of FIG. 10;

FIG. 13 is an enlarged fragmentary view taken in the area of FIG. 12;

FIG. 14 is a view similar to FIG. 12 illustrating a modification;

FIG. 15 illustrates a further modification, corresponding to FIG. 10, employing a single price wedge element; and FIG. 16 is a fragmentary view of an alternative resilient band retention means.

With reference to FIGS. 1 and 2, the principle of the present toggle load block drive engagement and release is illustrated with 5° pulley face angles. Radial inward loading on the inner load block legs by tension belt creates wedging engagement with 5° pulley faces producing normal reaction forces equal to 11.47 times radial loading in order to provide an equal radial component (ratio=1/sine 5°). The opposing force couples produced by said radial and reaction forces on the respective toggle elements are resisted by compressive engagement of the outer load block legs which, together with reaction at the pulley faces, provide balancing force couples adding to the effective driving contact pressure between load block elements and pulley faces.

Figure 1:
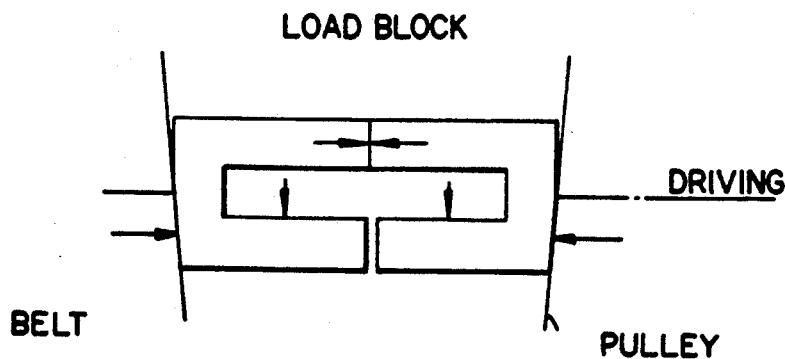
FIG. 1 is a diagrammatic view of two-piece toggle load block engaging 5° pulley faces.
Figure 2:
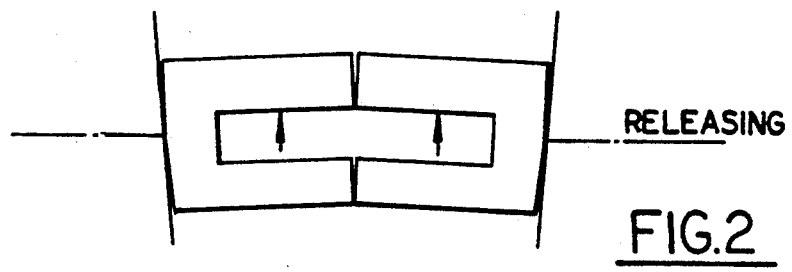
FIG. 2 is a diagrammatic view of two-piece toggle load block releasing pulley faces.

Upon leaving each pulley, radial loading incident to curvature in tension belt is eliminated by the transition to tangential exit and the direction of radial contact with toggle elements is reversed as shown in FIG. 2. Clearance between inner legs 11, together with elimination of opposing force couples cause release of reaction load block/pulley contact without resistance to pulley disengagement. Releasing deflection, shown with exaggeration in FIG. 2, is accommodated by clearance angles above pulley contact together with central clearance.

Figure 3:
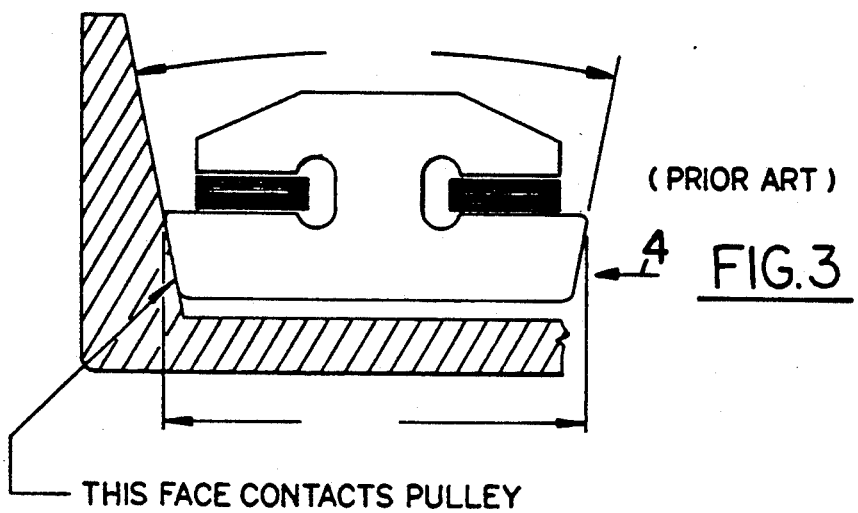
FIG. 3 is a fragmentary sectional view of prior art pulley engaged by rigid transverse load blocks.
Figure 4:
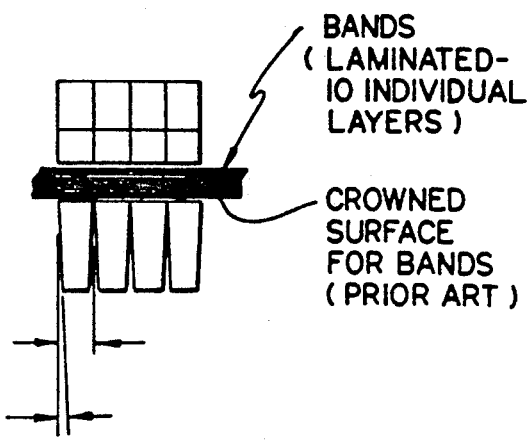
FIG. 4 is a fragmentary end view of plural load blocks of FIG. 3 mounted on a plurality of laminated bands.
Figure 5:
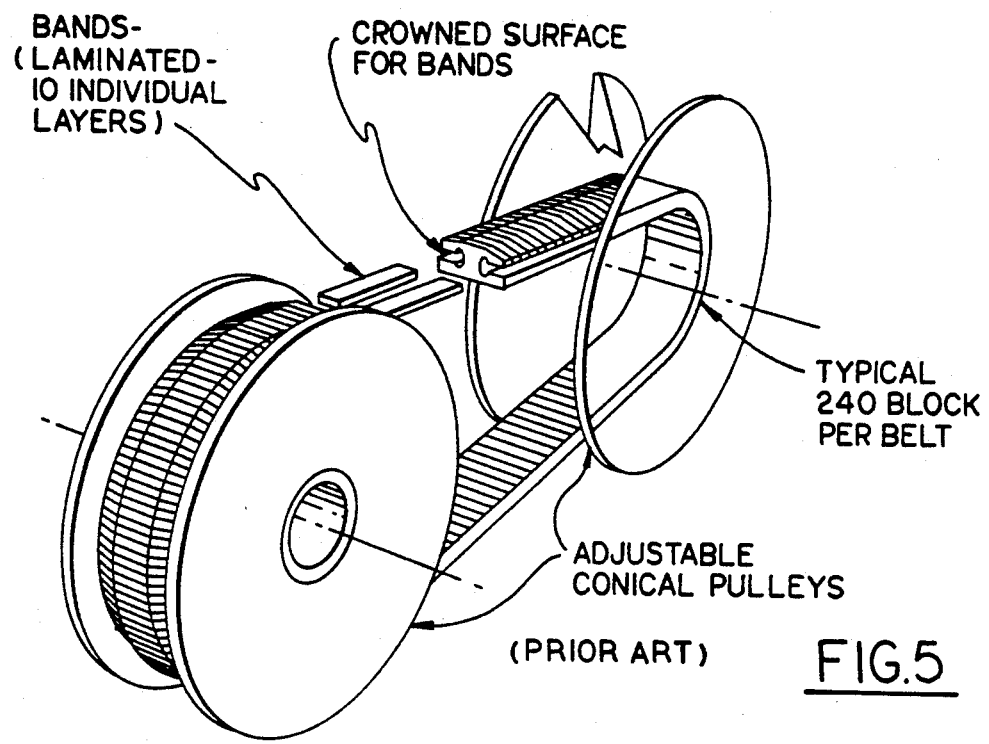
FIG. 5 is a schematic perspective view of prior art adjustable conical pulleys employing belt of FIGS. 3 and 4.

With reference to FIGS. 3, 4 and 5, prior art metal belt drive of the Van Doorne type is illustrated with variable diameter pulleys to produce a continuously variable transmission. The construction of the belt requires no hinged joints or pins. It consists of a series of thin V-shaped hardened steel blocks. These are stacked together to provide a driving surface which mates with the pulley faces at varying diameters. The blocks are constrained by two multiple layer endless steel bands which slip into slots in the sides of the blocks. The bands are not fastened to the blocks but retain their position by centering on a slight crown in the surface of each block at the contact point.

In contrast with other belt drives, the system relies on compression of the block elements to transmit power rather than relying on tension in the band. Since the blocks are not connected to each other or to the bands, force must be transmitted from one pulley to the other by pushing the blocks in a path described by the bands.

Figure 6:
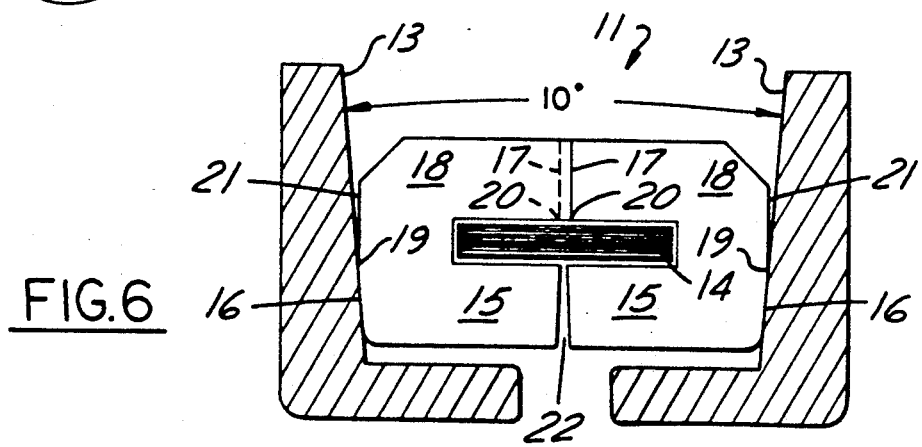
FIG. 6 is a view corresponding to FIG. 3 employing two-piece toggle load blocks of present invention in place of rigid one-piece load blocks of FIG. 3.

With reference to FIG. 6, the present invention substitutes a pair of toggle elements 11 for each single piece solid load block 12 of the prior art metal belt drive. Pulley faces 13 are provided with reduced 5° angle faces (10° included) which provide a sine ratio of 11.47:1. A single laminated belt 14 with a plurality of individual layers replaces the pair of prior art laminated bands shown in FIG. 3. Radial load imposed by tension in the laminated belt 14 is applied on the lower legs 15 of toggle elements 11 and, if slightly crowned, will concentrate radial pressure at the center and serve to centralize belt 14 relative to toggle elements 11 during running operation of the drive. Reaction loading on the toggle elements at 16 will equal 11.47 times radial loading as a sine function of the 5° angle and additional reaction loading at the pulley face engagement will result from the counter-torque imposed on the respective toggle elements 11 resisted by reaction contact at 16 and interengagement 17 of upper legs 18.

By constructing each pair of toggle elements 11 with slightly different length in the upper legs 18 and alternating the respective long and short legs of each pair circumferentially, slight staggered overlap in the abutting ends of adjacent pairs will serve to maintain alignment of each pair during running operation.

By limiting the radial engagement extremity 19 of toggle elements 11 with pulley faces 13, at or inside the abutting contact extremity 20 of toggle elements 11 and providing a slight clearance angle 21 outside of engagement extremity 19, as well as slight clearance 22 between adjacent ends of lower legs 15, a free release of the toggle elements upon exiting each pulley is effected upon the transition of belt 14 from curved to straight path.

Figure 7:
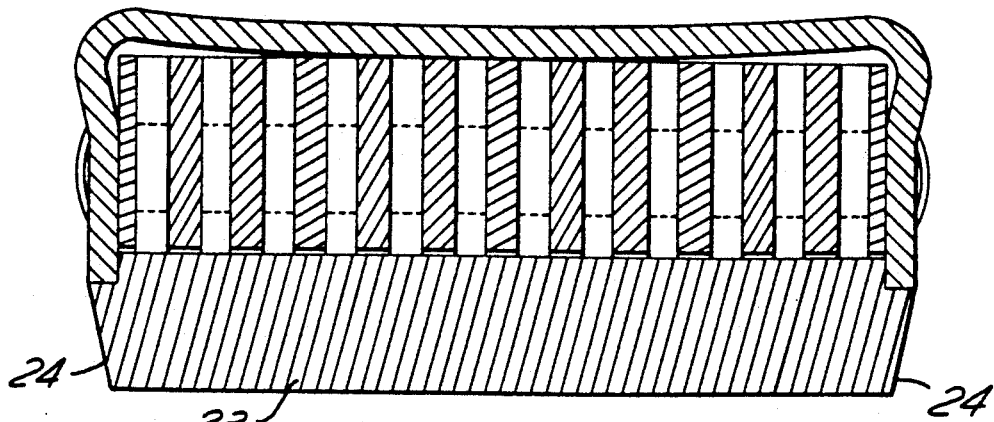
FIG. 7 is a sectional view of a prior art chain link belt employing single piece rigid transverse load blocks.
Figure 8:
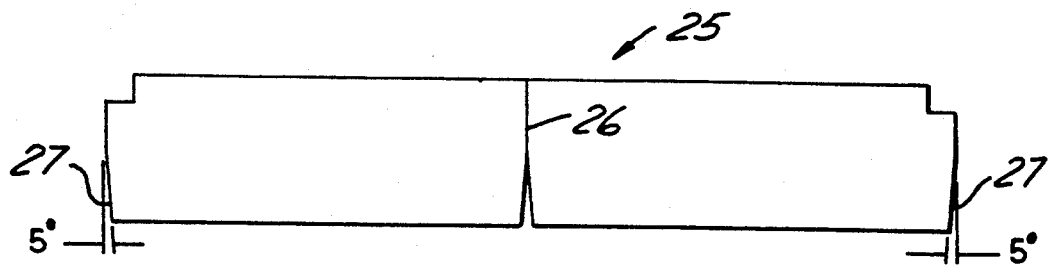
FIG. 8 is a view of two-piece load blocks of present invention to replace rigid one piece load blocks of FIG. 7.
Figure 9:
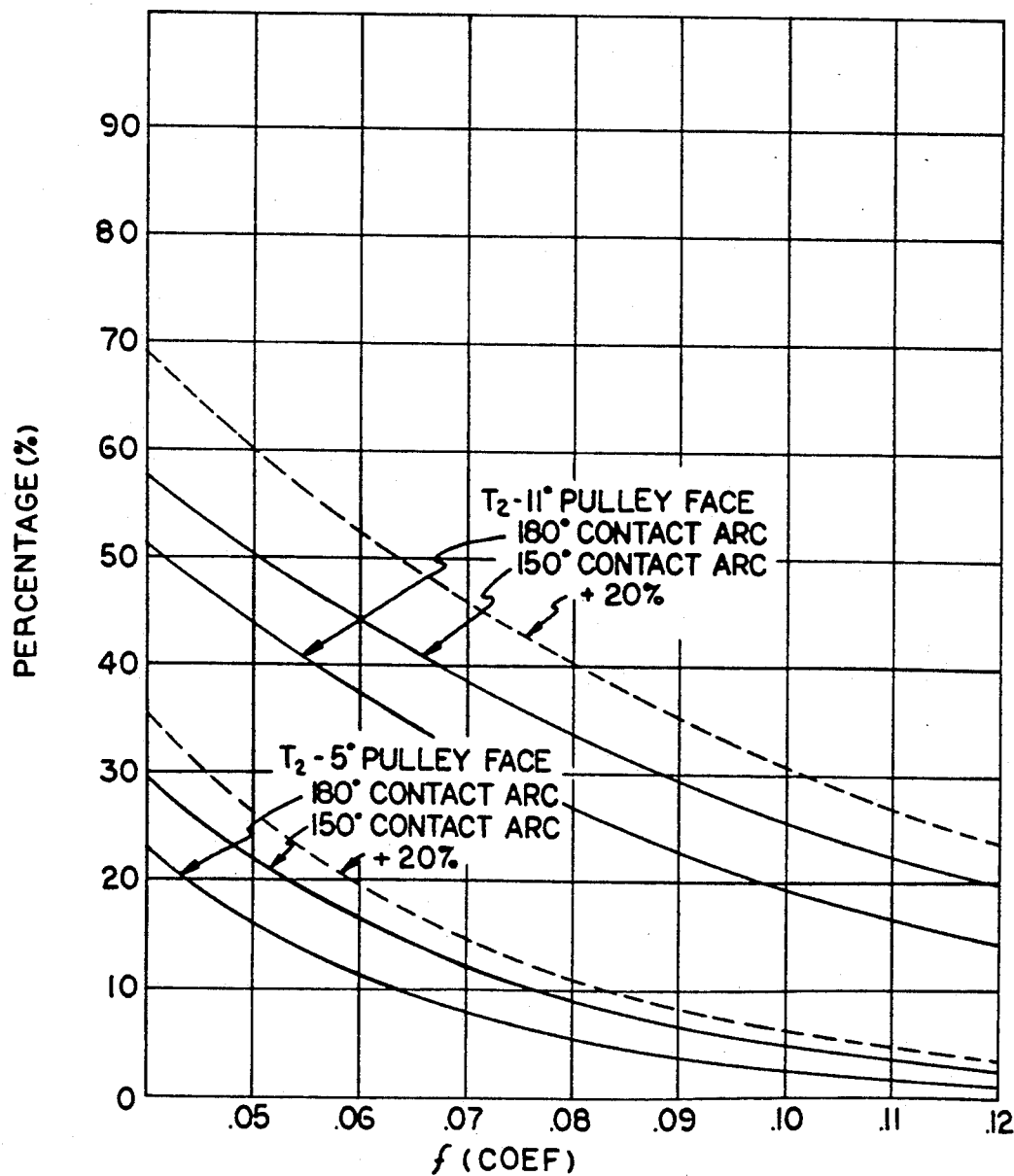
FIG. 9 is a graphic representation of comparative minimum belt back tension required for nonslip operation for different pulley angles.

With reference to FIG. 7, a rigid load block 23 is illustrated from a prior art construction corresponding to FIG. 9 in U.S. Pat. No. 5,007,883 disclosing a chain belt wherein 11° pulley face angles are employed for engagement by load block ends 24 corresponding to the 22° included angle illustrated in FIG. 3. By substituting a pair of toggle elements 25, as shown in FIG. 8, having abutting interengagement at 26, extending radially outward of 5° pulley engaging surfaces 27, with clearance provided radially inward of abutting surfaces 26, and radially outward of 5° engaging surfaces 27, free release of the toggle elements upon exiting each pulley can be provided as in the case of the FIG. 6 embodiment.

In each case, a toggle effect in spreading the pulley engaging ends is provided by radial loading, which may be maximized by a central concentration of the radial loading, supplementing the high reaction loading incident to the 5° pulley angle. Accordingly, the ratio of required back tension to achieve nonslip operation may be reduced substantially to a nominal value.

With reference to FIG. 9, a comparison of relative back tension $T_2$ required for 11° and 5° pulley angles, as a percentage of drive tension at 100%, has been graphically illustrated for a complete range of potential friction coefficients involving hardened steel pulley load block engagement running in oil environment, typically with a 0.09 friction coefficient. The graphic curves were calculated on the basis of the formula:

$$T_1 = T_2 e^{fa}$$

As explained above, the coefficient of friction "f" has been amplified by the sine function of respective 11° and 5° pulley angles but with no reflection of $T_1/T_2$ ratio increase through the supplemental toggle effect.

In the event convex pulley faces are employed to equalize lateral shifting of the belt incident to change of ratio with two diagonally opposed axially fixed pulley halves, as suggested in applicant's prior U.S. Pat. No. 3,044,316, Col. 14, ls. 5-42, pulley containing ends of the toggle elements are preferably beveled to maintain contact at the pitch line of the belt at the outermost radius of contact, notwithstanding a slight clearance radially inward of the pitch line at the smaller radii of contact. With such convex pulley faces, a 5° angle, 10° included, at minimum radius may be provided to preserve the benefit of high reaction traction loading at the most critical torque radius.

With reference to the compression belt of FIGS. 3-6, the curves of FIG. 9 do not have direct application. The compressive loading on the driving side of the belt requires additional belt tension to maintain load blocks in effective driving engagement with the pulleys against compressive forces directed to disengage radial contact. The absence of positive drive connection between belt bands and load blocks with lubricated surface interengagement accommodates equalization of circumferential tension in the application of radial load on the load blocks, notwithstanding a progressive diminishing of load block compression over the arc of contact in transferring torque to the driven pulley, and progressive increase in compression over the arc of contact in transferring torque from the driving pulley to the compression drive side of the belt. If the belt is run with compressive preloading directed to avoid separation of the load blocks on the nondriving side of the belt under maximum torque conditions where maximum compression takes place on the driving side of the belt, it may be desirable to further preload the initial compression assembly of the belt to include required tensioning of the bands through axial pulley compression for maintaining nonslip driving contact of the load blocks at the respective pulleys.

Notwithstanding such differences between tension and compression drives, it is clear that required nonslip driving contact pressure for any given torque and power requirement can be maintained with a much lower belt tension in the case of 5° pulley faces; or with corresponding increase in torque and power capacity for any given belt tension and bearing load capacity.

In final effect, the conversion of pulley face angles from prior art 11° to a much smaller angle such as 5° through the use of the present toggle load blocks, providing free release from an otherwise locking sticking angle, can substantially increase the torque and power capacity of a given size of variable V-pulley transmission to include an increased range of power requirements for larger and higher powered vehicles.

DESCRIPTION OF ADDITIONAL EMBODIMENTS

With reference to FIG. 10, toggle elements 30 and wedge elements 31 cooperate to clamp belt 32 between the lower surface 33 of each wedge element and the upper surface 34 of the inner leg 35 of each toggle element. Such upper surface may be formed with a slight crown, as illustrated in FIG. 13, matching belt curvature at its innermost radius to avoid edge stress line contact on the belt.

As shown in FIG. 11, the inner legs 35 of each pair of toggle elements may overlap with projections 36 providing an interlock against separation from the belt in the straight runs between pulleys where release action upon leaving the pulleys leaves the elements in a loose condition. Such interlock is provided with enough clearance 37 to accommodate toggle release, correspond to the schematic view of FIG. 2, with the interlock projections of minimum extension.

With reference to FIG. 12, adjacent toggle elements are shown in respective straight, and in pulley engaging relation for minimum pulley radius.

With reference to FIG. 14, a slight matching arc may be provided, if warranted, in the respective adjacent ramp surface 41' and 40' of the wedge and toggle elements in order to assure maintenance of individual wedge and toggle element pair alignment.

With reference to FIG. 15, a modification is shown which substitutes a single bound faced wedge element 31" for the pair shown in FIG. 10. The interlock provision of FIG. 11 is not employed but an alternative retention means is provided by recess 50 in the single piece wedge 31" trapping respective projections 51 of the toggle elements 30". Simple clearance 52 is provided between legs 35' to accommodate toggle release action.

With reference to FIG. 16, as an alternative to the interlock shown in FIGS. 11 and 15, an elastic band 52, such as an oil resistant elastomer or loft convoluted spring wire, may be employed with appropriate side edge engagement to retain the individual toggle elements against lateral displacement between pulleys. A slight staggered overlap 53 in adjacent toggle elements may be provided to maintain individual wedge and toggle element alignment.

The 30° wedge angle shown in FIGS. 10 and 15 may be modified to provide more or less clamping force, relative to pulley drive, which need be only sufficient to prevent gross slippage under prevailing friction coefficient.

The convex equalizing pulley face referred to above in the BRIEF DESCRIPTION can be derived from formulae for respective pulley radii throughout the variable range;

Starting with belt length "L" for ratio extremity from maximum pulley radius "R" to minimum radius "r"; pulley center distance "C"; belt angle "a" relative to center line between pulley axes; arc of contact $(180°+2a)$ for large pulley and $(180°-2a)$ for small; the progressive change in respective radii R' and r' between maximum and 1:1 ratios can be determined under the following formulae:

$$L = (2R\pi) \times ((180 + 2a)/360) + (2r\pi) \times ((180 - 2a)/360) + (2C\cos a);$$

$$(L - (2C\cos a')/2\pi = R'((180 + 2a')/360) + r'((180 - 2a')/360);$$

and $$R' - r' = C\sin a'$$

Solving for progressive values of a' will provide corresponding ratio change in R' and r' up to and through 1:1 ratio. Starting with a given minimum slope, e.g., 5°, at minimum pulley radius, the relative rate of radial increments at each respective radial point of progressive ratio change will define the required respective pulley face slopes to produce equalized lateral displacement. The smaller pulley radius up to 1:1 ratio will change in larger radial increments than correspond radial reductions in the large pulley radius, therefore requiring a greater relative pulley face angle at the corresponding larger pulley radius reaching a maximum at the maximum radius.

In a typical case involving a ratio spread of six, a face angle professing from 5° to slightly greater than 7° at maximum radius can provide true lateral equalization throughout the ratio range.

It will be understood that the clamping action of this embodiment may be employed in a V-belt tension drive with any smooth surface belt and will accommodate the use of multiple independent bands nested to provide total net tensile strength for virtually any required vehicle torque capacity, with only nominal back tension and minimum shaft bearing loads.

I claim:

1. V-belt transmission comprising endless belt running between V-pulleys with transverse load blocks mounted on said belt providing drive engagement with said pulleys, characterized by locking face angles on said V-pulleys, less than 11° (22° included), said load blocks constructed as pairs of toggle elements contacting at center with bridging pulley drive engagement under radial belt load, and including means for free release from said drive engagement upon release of said radial belt load in exiting from said respective pulleys.

2. Transmission of claim 1 wherein said toggle elements have matching angle contact with said pulleys extending radially inward of said center contact.

3. Transmission of claim 2 wherein said center contact comprises a surface contact extending radially outward of said pulley contact.

4. Transmission of claim 3 wherein clearance is provided at the ends of said toggle elements radially outward of said driving engagement sufficient to accommodate deflection of said toggle elements in releasing said drive engagement.

5. Transmission of claim 4 including center clearance between said toggle elements radially inward of their center contact sufficient to accommodate free radially outward release deflection upon drive engagement release in leaving the respective pulleys.

6. Transmission of claim 1 wherein said bridging engagement includes means for producing a counter-torque toggle effect increasing pulley engagement pressure.

7. Transmission of claim 6 including means for concentrating radial load centrally to augment said toggle effect.

8. Transmission of claim 1 constructed of metal pulleys and metal load blocks.

9. Transmission of claim 8 wherein said metal comprises hardened steel adapted for power transmission in an oil environment providing a coefficient of friction of approximately 0.09.

10. Transmission of claim 1 wherein said endless belt comprises endless flexible band means.

11. Transmission of claim 10 wherein said toggle elements are constructed with a U-configuration providing aligned slots for said band means.

12. Transmission of claim 11 wherein the contacting radially outer legs of each pair are provided with a slightly different length so that when assembled with alternate contiguous configuration a staggered interengagement for maintaining alignment may be effected.

13. Transmission of claim 11 wherein said toggle elements are preloaded on said band means in circumferential compressive engagement.

14. Transmission of claim 1 wherein said endless belt comprises a pivotally linked chain with means for retaining said toggle elements for transverse pulley engagement.

15. Transmission of claim 14 wherein said toggle elements comprise load blocks in the form of elongated bars having radially outward central contact relative to radially inward pulley contact.

16. Transmission of claim 1 wherein said respective pulley faces are provided with a face angle of approximately 5° and said toggle elements are provided with matching angle ends.

17. V-belt transmission comprising endless belt running between V-pulleys with transverse load blocks mounted on said belt providing drive engagement with said pulleys, characterized by said load blocks constructed as pairs of toggle elements reacting at center with bridging pulley drive engagement under radial belt load, and including means for free release from said drive engagement upon release of said radial belt load in exiting from said respective pulleys.

18. Transmission of claim 17 wherein said toggle elements engage said pulleys radially inward of reaction at center.

19. Transmission of claim 18 wherein each of said toggle elements is constructed with an inwardly open V configuration having respective legs extending radially inward and outward of said belt, and wherein said reaction at center is provided by central wedge means engaged by the outer legs of said toggle elements which in turn provide belt clamping against the inner legs respective to pulley drive engagement.

20. Transmission of claim 19 including one-piece double face central wedge means.

21. Transmission of claim 20 including means for retaining said toggle elements against lateral disengagement comprising a central recess in said one-piece wedge means engaged by projections at adjacent ends of said outer legs.

22. Transmission of claim 19 including elastic band means to retain the individual toggle elements against lateral displacement between pulleys.

23. Transmission of claim 22 including staggered overlap means in circumferentially adjacent toggle elements to maintain alignment of each pair.

24. Transmission of claim 17 including means for retaining said toggle elements against lateral disengagement.

25. Transmission of claim 17 including means for retaining said toggle elements against lateral disengagement comprising overlapping toggle element legs radially inward of said belt with interengaging projections.

* * * * *